(12) United States Patent
Tokozakura et al.

(10) Patent No.: US 10,442,285 B2
(45) Date of Patent: Oct. 15, 2019

(54) COOLING APPARATUS FOR VEHICLE

(71) Applicant: TOYOTA JIDOSHA KABUSHIKI KAISHA, Toyota-shi (JP)

(72) Inventors: Daisuke Tokozakura, Susono (JP); Kazuya Arakawa, Fujinomiya (JP); Takahiro Shiina, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/357,591

(22) Filed: Nov. 21, 2016

(65) Prior Publication Data
US 2017/0144532 A1    May 25, 2017

(30) Foreign Application Priority Data

Nov. 24, 2015  (JP) ................................. 2015-228676
Jul. 15, 2016   (JP) ................................. 2016-140909

(51) Int. Cl.
*B60K 11/02*  (2006.01)
*B60K 1/02*   (2006.01)
(Continued)

(52) U.S. Cl.
CPC ................ *B60K 11/02* (2013.01); *B60K 1/02* (2013.01); *B60L 50/16* (2019.02);
(Continued)

(58) Field of Classification Search
CPC .... B60K 11/01; B60K 2001/006; B60K 6/20; F01P 7/14; F01P 2007/146; F01P 2050/24; B60Y 2400/89; B60Y 2306/05
See application file for complete search history.

(56) References Cited

U.S. PATENT DOCUMENTS 6,201,365 B1 *  3/2001  Hara ..................... B60K 6/26
                                                            310/54
6,323,613 B1 * 11/2001  Hara ..................... B60K 6/26
                                                            165/299
(Continued)

FOREIGN PATENT DOCUMENTS

CN        200996366 Y     12/2007
CN       1 01 4201 69 A   4/2009
(Continued)

OTHER PUBLICATIONS

U.S. Appl. No. 15/386,835, filed Dec. 21, 2016, entitled "Vehicular Cooling System", inventor: Tokozakura, et al.
(Continued)

*Primary Examiner* — James A Shriver, II
*Assistant Examiner* — Steve Clemmons
(74) *Attorney, Agent, or Firm* — Oblon, McClelland, Maier & Neustadt, L.L.P.

(57) ABSTRACT

A cooling apparatus for a hybrid vehicle is provided with an oil circulating circuit supplying oil discharged from an electric oil pump to a first motor, a second motor, an inverter, and a lubrication-required part, and the oil circulating circuit includes: a first circuit supplying the oil that is discharged from the electric oil pump, and is cooled by an HV radiator to the inverter, the first motor, and the second motor; and a second circuit supplying the oil that is discharged from the electric oil pump without being cooled by the HV radiator to the lubrication-required part.

13 Claims, 3 Drawing Sheets

(51) Int. Cl.
*B60L 50/16* (2019.01)
*B60K 1/00* (2006.01)
(52) U.S. Cl.
CPC .. *B60K 2001/003* (2013.01); *B60K 2001/006* (2013.01); *B60Y 2200/92* (2013.01); *B60Y 2306/03* (2013.01); *B60Y 2306/05* (2013.01); *B60Y 2400/89* (2013.01); *Y10S 903/904* (2013.01)

(56) References Cited

U.S. PATENT DOCUMENTS

| | | | | |
|---|---|---|---|---|
| 6,641,372 | B2* | 11/2003 | Rytlewski | B62D 5/062 |
| | | | | 417/279 |
| 8,042,331 | B2* | 10/2011 | Schultz | F16H 61/0031 |
| | | | | 60/449 |
| 8,169,110 | B2* | 5/2012 | Swales | H02K 11/048 |
| | | | | 310/54 |
| 8,708,071 | B2* | 4/2014 | Yokoyama | B60L 1/003 |
| | | | | 165/104.33 |
| 8,708,855 | B2* | 4/2014 | Matsushita | B60K 6/445 |
| | | | | 310/52 |
| 10,014,794 | B2* | 7/2018 | Lei | B60R 16/03 |
| 2002/0073726 | A1 | 6/2002 | Hasebe et al. | |
| 2002/0192080 | A1 | 12/2002 | Rytlewski et al. | |
| 2009/0032229 | A1 | 2/2009 | Gallegos-Lopez et al. | |
| 2009/0154101 | A1 | 6/2009 | Korich et al. | |
| 2011/0084561 | A1 | 7/2011 | Swales et al. | |
| 2011/0232786 | A1 | 9/2011 | Matsushita et al. | |
| 2012/0168140 | A1 | 7/2012 | Yokkoyama et al. | |
| 2012/0222438 | A1 | 9/2012 | Osaka et al. | |
| 2013/0270038 | A1* | 10/2013 | Nitta | B62K 11/04 |
| | | | | 184/6 |
| 2016/0236748 | A1* | 8/2016 | Matsuda | B62K 11/04 |

FOREIGN PATENT DOCUMENTS

| | | | |
|---|---|---|---|
| CN | 101465595 | A | 6/2009 |
| CN | 102574472 | A | 7/2012 |
| CN | 102695782 | A | 9/2012 |
| CN | 102869903 | A | 1/2013 |
| CN | 104216492 | A | 12/2014 |
| EP | 2 520 637 | A1 | 11/2012 |
| JP | 53-42360 | A | 4/1978 |
| JP | 7-312805 | A | 11/1995 |
| JP | 2001-53207 | A | 2/2001 |
| JP | 2002-187435 | | 7/2002 |
| JP | 2004-324445 | | 11/2004 |
| JP | 2006-248417 | A | 9/2006 |
| JP | 2009-126256 | A | 6/2009 |
| JP | 2011-98628 | | 5/2011 |
| JP | 2011-111140 | | 6/2011 |
| JP | 2011-130642 | A | 6/2011 |
| JP | 2011225134 | A * | 11/2011 |
| JP | 2012-31359 | A | 2/2012 |
| JP | 2012-171557 | | 9/2012 |
| JP | 2013-199853 | | 10/2013 |
| JP | 2014-061873 | A | 4/2014 |
| JP | 2015-112943 | A | 6/2015 |
| WO | WO 2012/090463 | A1 | 7/2012 |
| WO | WO 2015/049711 | A1 | 4/2015 |

OTHER PUBLICATIONS

Office Action dated Aug. 28, 2018 in Japanese Patent Application No. 2017-078697, citing documents AO-AS therein, 3 pages (submitting English language translation only).

* cited by examiner

COOLING APPARATUS FOR VEHICLE

INCORPORATION BY REFERENCE

The disclosure of Japanese Patent Application No. 2015-228676 and 2016-140909 filed on Nov. 24, 2015 and Jul. 15, 2016 including the specification, drawings and abstract is incorporated herein by reference in its entirety.

BACKGROUND

1. Technical Field

The present disclosure relates to a cooling apparatus for a vehicle.

2. Description of Related Art

There have been known inverter cooling circuits for cooling inverters electrically connected to electric motors as cooling apparatuses for hybrid vehicles including engines and the electric motors. It has been known that inverter cooling circuits circulate coolant (inverter coolant).

There have been known engine cooling circuits that use coolant (engine coolant) different from inverter coolant. Japanese Patent Application Publication No. 2013-199853 discloses a cooling apparatus having an engine cooling circuit and a transaxle cooling circuit using oil as coolant, and carrying out heat-exchange between the engine coolant and the oil in a heat-exchanger. In the transaxle cooling circuit described in JP 2013-199853 A, a part required to be lubricated and warmed up with the oil (lubrication-required part), and a part required to be cooled with the oil (cooling-required part) are included in a transaxle case that is an oil supply destination.

SUMMARY

A hybrid vehicle is supposed to include a cooling apparatus having an inverter cooling circuit, an engine cooling circuit, and a transaxle cooling circuit. In the cooling circuits, dedicated liquids such as the inverter coolant, the engine coolant, and the oil are circulated through individual separate flow passages. Hence, the number of components configuring the respective cooling circuits probably becomes increased, thus causing increase in dimension of the entire cooling apparatus.

In the transaxle cooling circuit, if a part required to be lubricated and warmed up with the oil (lubrication-required part), and a part required to be cooled with the oil (cooling-required part) are included in a transaxle case that is an oil supply destination, it is necessary to supply warm oil to gears and others of a transmission that is the lubrication-required part in order to reduce resistance to agitation by the oil. Meanwhile, it is necessary to supply oil with a lower temperature to electric motors that are the cooling-required part in order to cool the electric motors.

However, in the aforementioned configuration, the oil of the transaxle cooling circuit is supplied to both the lubrication-required part and the cooling-required part in the transaxle case without a distinction therebetween. Hence, in the case of prioritizing cooling rather than lubrication, the part desired to be warmed up (lubrication-required part) might be cooled along with the part desired to be cooled (cooling-required part). Meanwhile, in the case of prioritizing lubrication rather than cooling, the part desired to be cooled (cooling-required part) might be warmed along with the part desired to be warmed up (lubrication-required part).

The present disclosure provides a cooling apparatus for a vehicle capable of promoting reduction in dimension of the cooling apparatus as well as enhancement of a cooling performance and a lubrication performance thereof.

An aspect of the present disclosure provides a cooling apparatus for a vehicle. The vehicle includes electric motors, an inverter, and a power transmission mechanism. The inverter connected to the electric motors. The power transmission mechanism is configured to transmit power outputted from each of the electric motors to wheels. The power transmission mechanism includes a lubrication-required part. The cooling apparatus includes an oil pump, an oil cooler, a first circuit and a second circuit. The oil pump is configured to discharge oil. The oil cooler is configured to cool the oil discharged from the oil pump. The first circuit is configured to supply the oil discharged from the oil pump via the oil cooler to the electric motor and the inverter. The second circuit is configured to supply the oil discharged from the oil pump not via the oil cooler to the lubrication-required part.

According to the above configuration, it is possible to supply the oil to the inverter, the electric motor, and the lubrication-required part using only a single oil pump. Accordingly, it is possible to attain reduction in dimension of the cooling apparatus. The cooling apparatus having a reduced dimension is installed in a vehicle, thereby promoting enhancement of fuel efficiency of the vehicle. A first circuit is a cooling circuit that cools the oil discharged from the oil pump by the oil cooler, and then supplies the oil to the inverter and the electric motors. A second cooling circuit is a lubricating circuit that supplies the oil discharged from the oil pump to the lubrication-required part without cooling the oil by the oil cooler. Through this, it is possible to cope with both the cooling performance and the lubrication performance.

In the cooling apparatus, the oil pump may be an electric oil pump.

According to the above configuration, by using the electric oil pump, it is possible to cool the electric motors as well as supply the lubricating oil to the lubrication-required part during the EV driving of the vehicle. It is also possible to control each oil flow rate of the first circuit and the second circuit by the electric oil pump.

In the cooling apparatus, the first circuit and the second circuit may branch from each other at a branch point between the oil pump and the oil cooler.

The cooling apparatus may further includes a flow rate control valve disposed at the branch point. The flow rate control valve may be configured to regulate a distribution flow rate into the first circuit and the second circuit.

According to the above configurations, it is possible to control distribution of the oil flow rate to the first circuit and the second circuit depending on the vehicle condition, such as load on the electric motors and the lubricating oil temperature, by a flow-rate control valve provided at a branch point.

In the cooling apparatus, the oil pump may have a first discharge port that discharges the oil to the first circuit, and a second discharge port that discharges the oil to the second circuit.

In the cooling apparatus, the first circuit may be a series circuit in which the inverter is arranged in series with the electric motors downstream of the oil pump, and the electric motors may be disposed downstream of the inverter.

According to the above configurations, the first circuit is a series circuit having the inverter between the oil cooler and the electric motors downstream of the oil pump. If a heat-resistant temperature is compared between the electric motors and the inverter, the inverter has a lower heat-resistant temperature. According to the first circuit, it is possible to supply the oil cooled by the oil cooler to the inverter prior to the electric motors.

In the cooling apparatus, the first circuit may be a parallel circuit in which the inverter is arranged in parallel with the electric motors downstream of the oil pump.

According to the above configuration, because the first circuit is a parallel circuit, it is possible to supply the oil cooled by the oil cooler to the electric motors not via the inverter. Through this, increase in temperature of the oil supplied to the electric motors is prevented because no heat-exchange with the inverter is carried out, and thus the electric motors are cooled with the oil having a lower temperature.

In the cooling apparatus, the first circuit may has an oil passage. The oil passage may have discharge holes that discharge the oil toward stators of the electric motors.

According to the above configuration, it is possible to directly cool stators with the oil by discharging the oil toward the stators.

According to the above configurations, the inverter cooling circuit and the transaxle cooling circuit are configured by respective circuits circulating an identical oil by using a single oil pump. Accordingly, it is possible to promote reduction in dimension of the cooling apparatus. Reduction in dimension of the cooling apparatus attains reduction in weight thereof, thereby enhancing fuel efficiency of a vehicle in which the cooling apparatus of which weight is reduced is installed. The first circuit supplies the inverter and the electric motor with the oil after being cooled, and the second circuit supplies the lubrication-required part with the not-cooled oil. Through this configuration, it is possible to promote enhancement of the cooling performance as well as the lubrication performance.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A cooling apparatus for a vehicle according to embodiments will be specifically described with reference to drawings, hereinafter.

Figure 1:
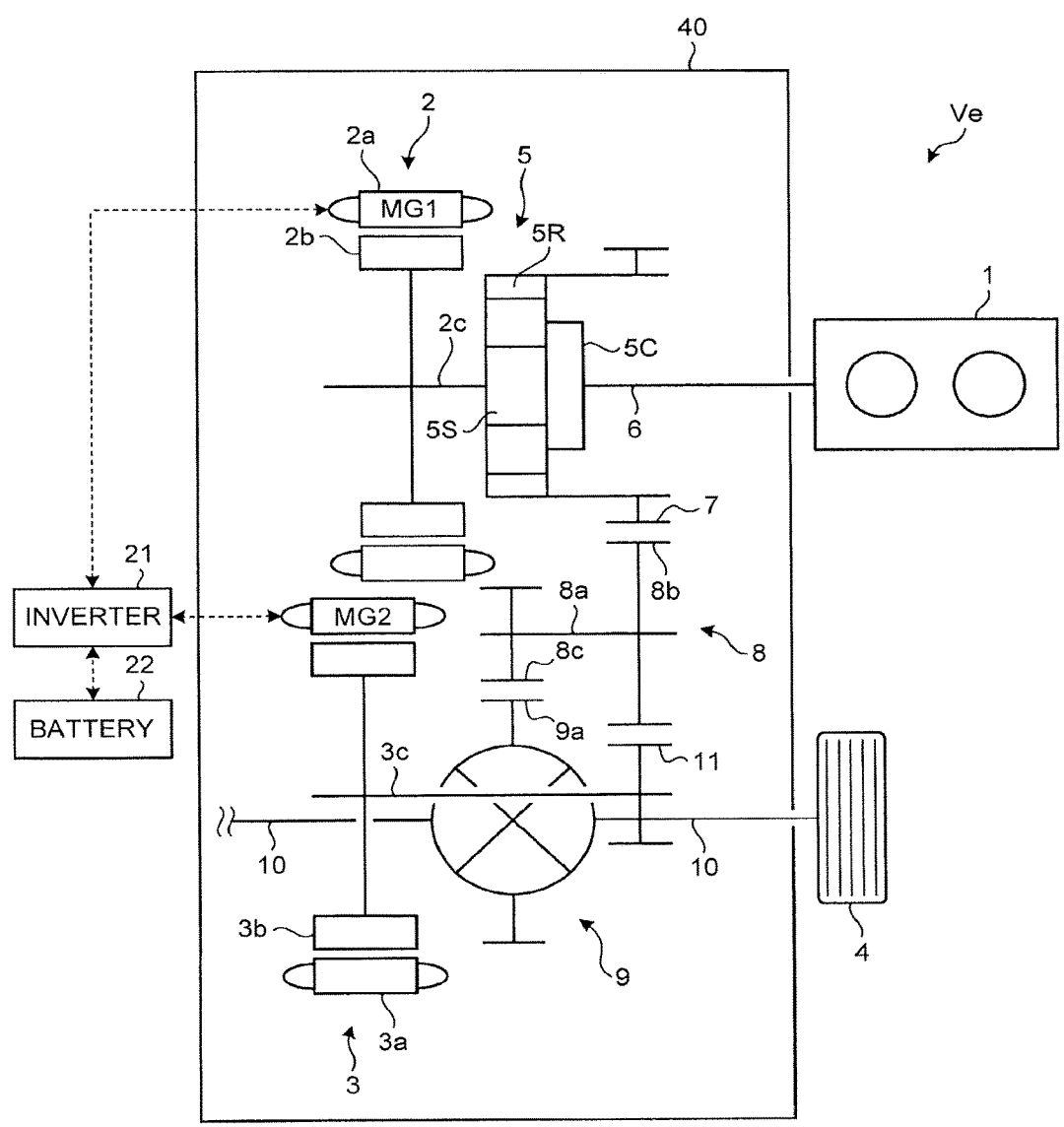
FIG. 1 is a skeleton view showing an example of a vehicle in which a cooling apparatus according to embodiments is installed.

The first embodiment will be described as below. FIG. 1 is a skeleton view showing an example of a vehicle in which a cooling apparatus is installed. A vehicle Ve is a hybrid vehicle including an engine (internal combustion engine) 1, a first motor (MG1) 2, and a second motor (MG2) 3, respectively as a power source. Each of the first motor 2 and the second motor 3 is a motor generator having a motor function and an electric power generating function. Each of the first motor 2 and the second motor 3 is electrically connected to a battery 22 via an inverter 21. The first motor 2 and the second motor 3 are an example of a cooling-required part in a transaxle case 40.

The vehicle Ve includes a power split mechanism 5 in a power transmission path from the engine 1 to driven wheels 4. In the vehicle Ve, power outputted from the engine 1 is split into the first motor 2 side and to the driven wheels 4 side by the power split mechanism 5. The first motor 2 generates electric power by the power outputted from the engine 1, and the generated electric power is stored in the battery 22, or is supplied to the second motor 3 via the inverter 21.

An input shaft 6, the power split mechanism 5, and the first motor 2 are arranged on the same axial line as an axial line of a crankshaft of the engine 1. The crankshaft and the input shaft 6 are coupled to each other via a not-shown torque limiter and others. The first motor 2 is adjacent to the power split mechanism 5, and is disposed on an opposite side to the engine 1 in the axial direction. The first motor 2 includes a stator 2a around which a coil is wound, a rotor 2b, and a rotor shaft 2c.

The power split mechanism 5 is a differential mechanism including multiple rotary elements, and an example of the power split mechanism 5 shown in FIG. 1 is configured by a single-pinion type planetary gear mechanism. As three rotary elements thereof, the power split mechanism 5 includes a sun gear 5S that is an external-teeth gear, a ring gear 5R that is an internal-teeth gear concentrically located to the sun gear 5S, and a carrier 5C holding pinion gears meshed with the sun gear 5S and the ring gear 5R in a manner as to allow rotations of the pinion gears around their own axes as well as orbital revolutions thereof.

A rotor shaft 2c of the first motor 2 is coupled to the sun gear 5S in a manner as to integrally rotate with the sun gear 5S. The input shaft 6 is coupled to the carrier 5C in a manner to integrally rotate with the carrier 5C. The engine 1 is coupled to the carrier 5C via the input shaft 6. An output gear 7 outputting torque from the power split mechanism 5 toward the driven wheels 4 side is integrated with the ring gear 5R. The output gear 7 is an external-teeth gear integrally rotating along with the ring gear 5R, and is meshed with a counter driven gear 8b of a counter gear mechanism 8.

The output gear 7 is coupled to a differential gear mechanism 9 via the counter gear mechanism 8. The counter gear mechanism 8 includes a counter shaft 8a disposed in parallel with the input shaft 6, the counter driven gear 8b meshed with the output gear 7, and a counter drive gear 8c meshed with a ring gear 9a of a differential gear mechanism 9. The counter driven gear 8b and the counter drive gear 8c are attached to the counter shaft 8a in a manner as to integrally rotate along with the counter shaft 8a. The driven wheels 4 are coupled to the differential gear mechanism 9 via right and left drive shafts 10.

The vehicle Ve is configured such that torque outputted from the second motor 3 is applied to torque to be transmitted from the engine 1 to the driven wheels 4. The second motor 3 includes a stator 3a around which a coil is wound, a rotor 3b, and a rotor shaft 3c. The rotor shaft 3c is disposed in parallel with the counter shaft 8a. A reduction gear 11 meshed with the counter driven gear 8b is attached to the rotor shaft 3c in a manner as to integrally rotate along with the rotor shaft 3c.

Figure 2:
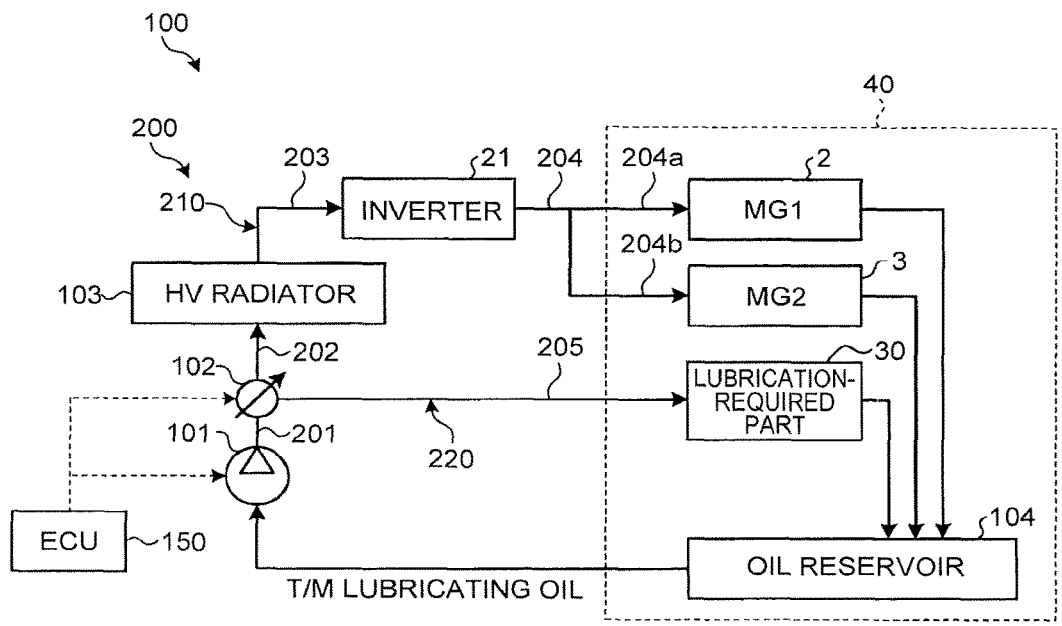
FIG. 2 is a schematic view showing a schematic configuration of a cooling apparatus according to a first embodiment.

FIG. 2 is a schematic view showing a schematic configuration of the cooling apparatus according to the first embodiment. The cooling apparatus 100 of the first embodiment is installed in the vehicle Ve as shown in FIG. 1, and is configured to cool the inverter 21 with a lubricating oil of a transmission (T/M lubricating oil).

As shown in FIG. 2, the cooling apparatus 100 includes an oil circulating circuit 200 for circulating the oil. The oil circulating circuit 200 includes a cooling circuit (referred to as a "first circuit", hereinafter) 210 for cooling the inverter 21, the first motor 2, and the second motor 3, and a lubricating circuit (referred to as a "second circuit", hereinafter) 220 for lubricating and warming up the lubrication-required part 30. The lubrication-required part 30 is a part of a power transmission mechanism of the vehicle Ve (as shown in FIG. 1), and the part (mostly gears) is required to be lubricated and warmed up with the oil in the transaxle case 40. The power transmission mechanism is a mechanism to transmit power output from a power source (the engine 1, the first motor 2, and the second motor 3) of the vehicle Ve to the wheels (driven wheels 4).

More specifically, the oil circulating circuit 200 has a structure to communicate an oil passage (inverter oil passage) supplying the oil as coolant to the inverter 21 with an oil passage (transaxle oil passage) supplying the oil to the cooling-required part and the lubrication-required part 30 inside the transaxle case 40. This means that only an identical liquid (the oil in the present embodiment) is circulated inside the oil circulating circuit 200 including the inverter oil passage and the transaxle oil passage.

In the cooling apparatus 100, a single electric oil pump 101 pumps and feed the oil in the oil circulating circuit 200 to a supply destination. The electric oil pump 101 is driven by an electric motor (not shown in the drawings). The electric motor driving the electric oil pump 101 is driven by control of an electronic control unit (ECU) 150. Specifically, the electronic control unit 150 is configured to control driving of the electric oil pump 101. Through the control by the electronic control unit 150, the electric oil pump 101 takes in the oil reserved in an oil reservoir 104, and discharges the oil from a discharge port thereof into a discharge oil passage 201. The oil discharged from the electric oil pump 101 into the discharge oil passage 201 is sent with a discharge pressure of the electric oil pump 101 so as to flow through the inside of the oil circulating circuit 200 toward downstream thereof.

A first circuit 210 includes the electric oil pump 101, the discharge oil passage 201, a flow-rate control valve 102, a pre-air-cooling oil passage 202, a radiator for a hybrid vehicle (referred to as an "HV radiator", hereinafter) 103, a first oil supply passage 203, the inverter 21, a second oil supply passage 204, the first motor 2, and the second motor 3. In the first circuit 210, after the oil discharged from the electric oil pump 101 is cooled by the HV radiator 103, the oil is supplied to the inverter 21, the first motor 2, and the second motor 3. In other words, in the first circuit 210, the oil flowing via the HV radiator 103 is supplied to the cooling-required part.

The discharge oil passage 201 is connected to a discharge port of the electric oil pump 101. The flow-rate control valve 102 is disposed between the electric oil pump 101 and the HV radiator 103 in the first circuit 210. The pre-air-cooling oil passage 202 is an oil passage extending between the flow-rate control valve 102 and the HV radiator 103. As shown in FIG. 2, the discharge oil passage 201 is connected to a supply port (inflow port) of the flow-rate control valve 102, and the pre-air-cooling oil passage 202 is connected to a first discharge port (port on the cooling side) of the flow-rate control valve 102. Hence, the oil discharged from the electric oil pump 101 is sent with pressure through the flow-rate control valve 102 to the HV radiator 103. At this time, the flow-rate control valve 102 regulates a flow rate of the oil flowing from the pre-air-cooling oil passage 202 into the HV radiator 103.

The HV radiator 103 is a heat-exchanger carrying out heat-exchange between the air (e.g., the outside air of the vehicle Ve) and the oil flowing through the first circuit 210. Specifically, the HV radiator 103 is an air-cooling type oil cooler. The oil flowing through the inside of the HV radiator 103 is heat-exchanged with the outside air of the vehicle Ve, thereby radiating heat. The pre-air-cooling oil passage 202 is connected to a supply port (inflow port) of the HV radiator 103, and a first oil supply passage 203 is connected to a discharge port (outflow port) of the HV radiator 103.

The first oil supply passage 203 is an oil passage extending between the HV radiator 103 and the inverter 21, and this oil supply passage supplies the oil after being air-cooled by the HV radiator 103 to the inverter 21. The first oil supply passage 203 is connected to a case inlet port (oil supply port) of the inverter 21. The oil after being air-cooled flows from the first oil supply passage 203 into the inside of the inverter 21, and comes into contact with a heat-generating part of the inverter 21 so as to directly carry out heat-exchange with the heat-generating part, thereby cooling the inverter 21.

A second oil supply passage 204 is connected to a case outlet port (oil discharge port) of the inverter 21. The second oil supply passage 204 is an oil passage extending between the inverter 21 and the first motor 2 and between the inverter 21 and the second motor 3, and the supply oil passage is used for supplying the oil air-cooled in the HV radiator 103 to the first motor 2 and the second motor 3. In the first circuit 210, the inverter 21 is connected in series with the first motor 2 and with the second motor 3 downstream of the electric oil pump 101, and the first motor 2 and the second motor 3 are disposed downstream of the inverter 21. That is, the first circuit 210 is a series circuit.

In an example as shown in FIG. 2, the second oil supply passage 204 branches at its downstream. The second oil supply passage 204 includes an MG1 cooling pipe 204a and an MG2 cooling pipe 204b. The MG1 cooling pipe 204a is one of the branching oil passages, and supplies the oil to the first motor 2. The MG2 cooling pipe 204b is the other of the branching oil passages, and supplies the oil to the second motor 3. Specifically, the MG1 cooling pipe 204a has a discharge hole discharging the oil toward the stator 2a that generates heat while being supplied with current so as to particularly cool the stator 2a in the first motor 2. The MG2 cooling pipe 204b has a discharge hole discharging the oil toward the stator 3a that generates heat while being supplied with current so as to particularly cool the stator 3a in the second motor 3. The respective cooling pipes 204a, 204b are disposed inside the transaxle case 40. The oil is discharged from the respective discharge holes of the cooling pipes 204a, 204b toward the corresponding stators 2a, 3a, thereby directly cooling the stators 2a, 3a.

After flowing through the inside of the first circuit 210, and cooling the first motor 2 and the second motor 3, the oil then flows into the oil reservoir 104 in the transaxle case 40. The oil reservoir 104 is configured by an oil sump, an oil pan, or the like that is formed at a bottom portion of the transaxle case 40. For example, after flowing through the first circuit 210 and cooling the first motor 2 and the second motor 3, the oil is brought to return to the oil reservoir 104 provided at the bottom portion of the transaxle case 40 by gravity, or the like.

The second circuit 220 includes the electric oil pump 101, the discharge oil passage 201, a flow-rate control valve 102, a third oil supply passage 205, and the lubrication-required part 30. The second circuit 220 supplies the lubrication-required part 30 with the oil discharged from the electric oil pump 101 without being air-cooled at the HV radiator 103. Specifically, in the second circuit 220, the lubrication-required part 30 is supplied with the oil flowing not via the HV radiator 103.

As shown in FIG. 2, the second circuit 220 branches from the first circuit 210 at the flow-rate control valve 102 that is a branch point. The flow-rate control valve 102 is disposed between the electric oil pump 101 and the HV radiator 103 so as to regulate a distribution flow rate (distribution of the oil flow rate) to the first circuit 210 and to the second circuit 220. Specifically, the first circuit 210 and the second circuit 220 branch from each other at the branch point between the electric oil pump 101 and the HV radiator 103. In other words, the first circuit 210 branches from the second circuit 220 via the flow-rate control valve 102 at the branch point. The third oil supply passage 205 is connected to a second discharge port (port on the lubrication side) of the flow-rate control valve 102.

The third oil supply passage 205 extends between the flow-rate control valve 102 and the lubrication-required part 30, and supplies the lubrication-required part 30 with the lubricating oil. In the vehicle Ve as shown in FIG. 1, the lubrication-required part 30 includes the power split mechanism 5, the counter gear mechanism 8, and the differential gear mechanism 9. The oil after flowing through the second circuit 220 and lubricating the lubrication-required part 30 flows into the oil reservoir 104.

The flow-rate control valve 102 is controlled by the electronic control unit 150. The electronic control unit 150 executes a flow rate control on the flow-rate control valve 102 so as to control the flow rate of the oil flowing through the inside of the first circuit 210 that is the cooling circuit, and also control the flow rate of the oil flowing through the inside of the second circuit 220 that is the lubricating circuit. For example, in order to increase the cooling performance for the first motor 2 and the second motor 3 depending on the driving condition of the vehicle Ve, the electronic control unit 150 controls the flow-rate control valve 102 to distribute more of the oil discharged from the electric oil pump 101 into the cooling circuit so as to increase the flow rate of the oil in the first circuit 210. Alternatively, the electronic control unit 150 controls the electric oil pump 101 to increase the rotation rate of the electric motor connected to the electric oil pump 101 so as to increase the discharge rate of the oil per unit time. Meanwhile, if the lubrication performance of the lubrication-required part 30 is required to be increased in order to warm up the transmission or the like, the electronic control unit 150 controls the flow-rate control valve 102 to distribute more of the oil discharged from the electric oil pump 101 into the lubrication circuit so as to increase the flow rate of the oil of the second circuit 220. Alternatively, the electronic control unit 150 controls the electric oil pump 101 to decrease the rotation rate of the electric motor connected to the electric oil pump 101 so as to reduce the discharge rate of the oil per unit time. In addition, by using the electric oil pump 101, it is possible to exert the cooling performance for the first motor 2 and the second motor 3 as well as the lubrication performance at the lubrication-required part 30 during the EV driving.

For example, using the following four parameters: a temperature of the lubricating oil, a temperature of the inverter 21, a motor temperature (each temperature of the first motor 2 and the second motor 3), and torque from the input shaft 6 (input torque), the electronic control unit 150 carries out the flow rate control through the electric oil pump 101 and the flow-rate control valve 102. In this case, the vehicle Ve is provided with sensors (not shown in the drawings) for detecting the respective parameters. Signals are inputted from the sensors into the electronic control unit 150. Specifically, using the four parameters, the electronic control unit 150 is configured to determine whether cooling should be prioritized rather than lubrication, or lubrication should be prioritized rather than cooling.

As aforementioned, according to the cooling apparatus 100 of the first embodiment, it is possible to supply the first motor 2 and the second motor 3 in the cooling-required part with the oil after being air-cooled by the HV radiator 103 from the first circuit 210, and also supply the gears and others in the lubrication-required part 30 with the oil that is not air-cooled from the second circuit 220. Through this, the first motor 2 and the second motor 3 are supplied with the oil having a temperature different from a temperature of the oil supplied to the lubrication-required part 30, and thereby enhancement of the cooling performance for the first motor 2 and the second motor 3 as well as enhancement of the lubrication performance at the lubrication-required part 30 are promoted. The oil circulating circuit 200 has an integral structure that uses the inverter cooling circuit as an oil passage (inverter oil passage) communicated with the transaxle oil passage. Hence, the inverter oil passage and the transaxle oil passage may be supplied with a common oil, so that the common oil can be circulated by using the single electric oil pump 101. Consequently, it is possible to attain reduction in dimension and reduction in weight of the cooling apparatus 100, and it is also possible to reduce the number of components configuring the cooling apparatus 100, thereby attaining reduction in cost thereof. The reduction in weight of the cooling apparatus 100 enhances fuel efficiency of the vehicle in which the cooling apparatus 100 is installed. In addition, by using the electric oil pump 101, it is possible to carry out the flow rate control through the electronic control unit 150.

The inverter coolant has electric conductivity. Hence, in an inverter cooling circuit, if the inverter coolant is used as coolant, the inverter coolant is usually protected from coming into contact with a heat-generating part (inverter element) of the inverter 21 that is supplied with current, in light of safety. Consequently, if heat-exchange is carried out between this heat-generating part and the inverter coolant, it is required to dispose an interposed substance such as a radiating plate therebetween, so that a heat resistance becomes greater by the interposed substance. To the contrary, in the cooling apparatus 100 of the first embodiment, the coolant is an oil, and has an electric insulation; therefore, the oil (coolant) can be brought into contact with the heat-generating part (inverter element) of the inverter 21 supplied with current. Specifically, in the cooling apparatus 100, it is possible to carry out direct heat-exchange between the oil (coolant) and the heat-generating part (heating source) in the inverter 21. Accordingly, no interposed substance such as a heat radiating plate is required, so that heat resistance between the coolant and the heat-generating part becomes reduced, and thus the cooling performance for the inverter 21 is enhanced. In addition, enhancement of the cooling performance for the inverter element promotes heat-resistance performance of the inverter 21. The inverter element is a package covered with a housing.

Figure 3:
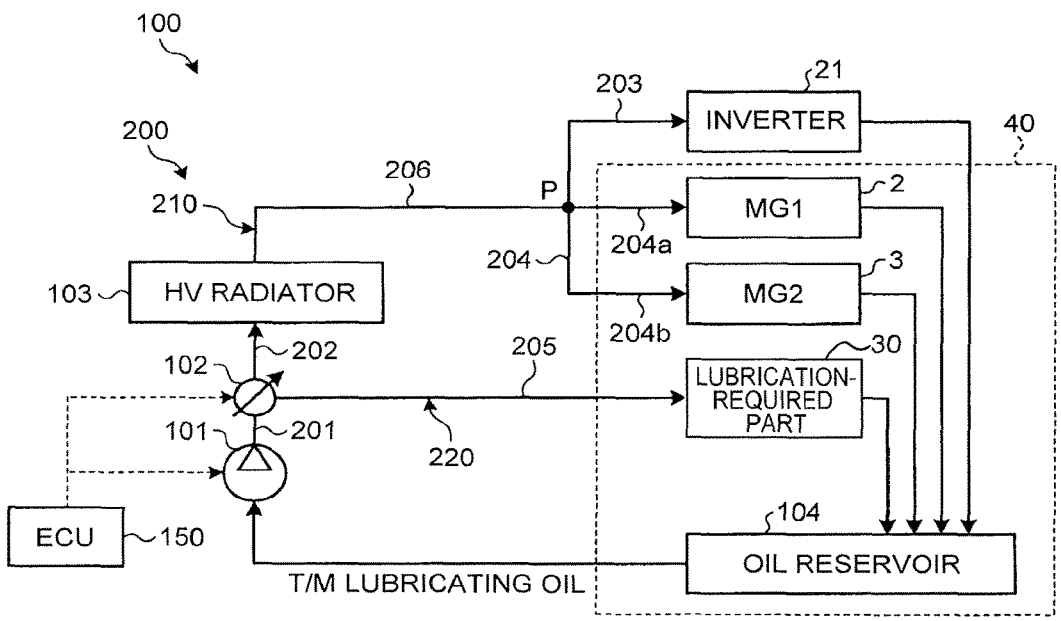
FIG. 3 is a schematic view showing a schematic configuration of a cooling apparatus according to a variation of the first embodiment.

FIG. 3 is a schematic view showing a schematic configuration of the cooling apparatus 100 in a variation of the first embodiment. In description of the variation, the same configurations as those in the aforementioned embodiment will not be described, and the same reference numerals are used.

As shown in FIG. 3, the cooling apparatus 100 of the variation includes the oil circulating circuit 200 in which the inverter 21, the first motor 2, and the second motor 3 are connected in parallel. In the oil circulating circuit 200, the inverter 21, the first motor 2, and the second motor 3 are arranged in parallel in the first circuit 210. This means that the first circuit 210 is a parallel circuit.

Specifically, a post-air-cooling oil passage 206 is connected to the discharge port of the HV radiator 103. The post-air-cooling oil passage 206 branches at its downstream part at a branch point P. At the branch point P, the post-air-cooling oil passage 206, the first oil supply passage 203, and the second oil supply passage 204 (the MG1 cooling pipe 204a and the MG2 cooling pipe 204b) are communicated with one another. This means that the oil passages inside the case of the inverter 21 are communicated with the HV radiator 103 via the post-air-cooling oil passage 206 and the first oil supply passage 203. The MG1 cooling pipe 204a of the first motor 2 is communicated with the HV radiator 103 via the post-air-cooling oil passage 206. The MG2 cooling pipe 204b of the second motor 3 is communicated with the HV radiator 103 via the post-air-cooling oil passage 206. The oil after flowing through the inside of the first circuit 210 and cooling the inverter 21 flows into the oil reservoir 104.

According to the cooling apparatus 100 of this variation, it is possible to supply the first motor 2 and the second motor 3 with the oil after being air-cooled by the HV radiator 103 without bringing the oil to flow through the inverter 21. Through this, the first motor 2 and the second motor 3 are supplied with the oil having no increase in temperature due to cooling of the inverter 21, so that it is possible to cool the first motor 2 and the second motor 3 with the oil having a lower temperature. Accordingly, it is possible to enhance the cooling performance for the first motor 2 and the second motor 3.

Now, a comparison is made between the case in which the inverter 21 is arranged in series with the first motor 2 and the second motor 3, as described in the above embodiment, and the case in which the inverter 21, the first motor 2, and the second motor 3 are arranged in parallel. In the first circuit 210, amount of the oil supplied to the first motor 2 and the second motor 3 becomes greater and a temperature of the oil becomes higher in the case in which the inverter 21 is arranged in series with the first motor 2 and the second motor 3 than those in the case in which the inverter 21, the first motor 2, and the second motor 3 are arranged in parallel. Meanwhile, in the first circuit 210, the amount of the oil supplied to the first motor 2 and the second motor 3 becomes smaller and the temperature of the oil becomes lower in the case in which the inverter 21, the first motor 2, and the second motor 3 are arranged in parallel than those in the case in which the inverter 21 is arranged in series with the first motor 2 and the second motor 3. This comparison is conducted under a condition having the same oil flow rate flowing from the flow-rate control valve 102 to the HV radiator 103.

The cooling apparatus 100 according to the second embodiment will be described hereinafter. The cooling apparatus 100 of the second embodiment includes the oil circulating circuit 200 having no flow-rate control valve 102 at the branch point between the first circuit 210 and the second circuit 220, which is different from the aforementioned first embodiment. In description of the second embodiment, the same configurations as those in the aforementioned first embodiment will not be described, and the same reference numerals are used.

Figure 4:
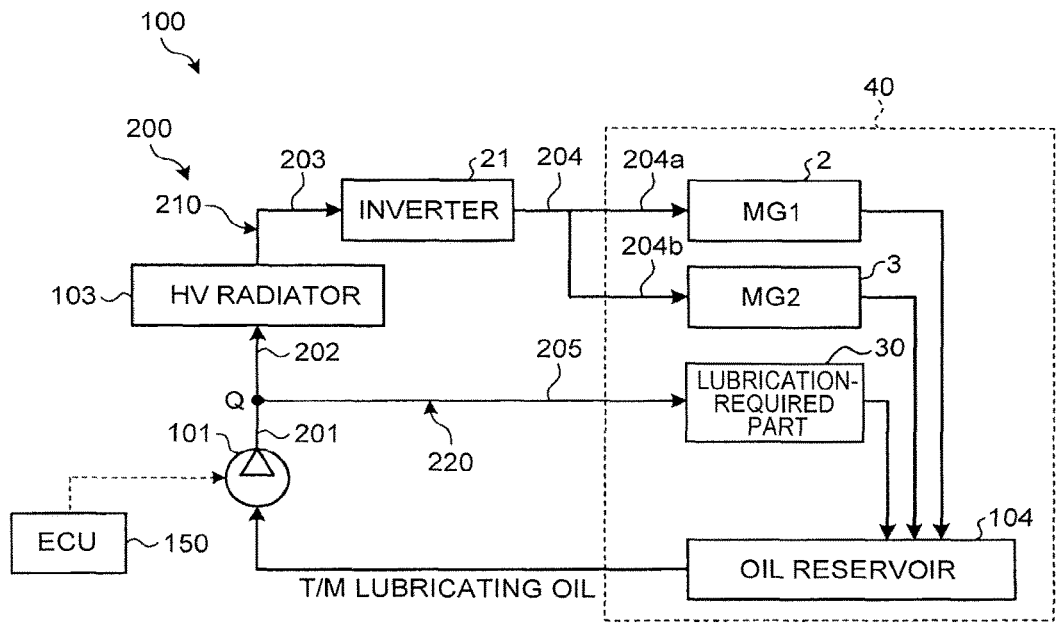
FIG. 4 is a schematic view showing a schematic configuration of a cooling apparatus according to a second embodiment.

FIG. 4 is a schematic view showing a schematic configuration of the cooling apparatus 100 according to the second embodiment. As shown in FIG. 4, in the oil circulating circuit 200 of the second embodiment, the first circuit 210 and the second circuit 220 branch from each other at a branch point Q. No flow rate control valve is provided at the branch point Q. This means that the second circuit 220 branches from the first circuit 210 without having the flow rate control valve therebetween at the branch point Q. In other words, the first circuit 210 branches from the second circuit 220 without having the flow rate control valve therebetween at the branch point Q.

The cooling apparatus 100 of the second embodiment is not limited to the configuration including the oil circulating circuit 200 (as shown in FIG. 4) in which the inverter 21 is arranged in series with the first motor 2 and the second motor 3, but the cooling apparatus 100 may include the oil circulating circuit 200 (not shown in the drawings) in which the inverter 21 is arranged in parallel with the first motor 2 and the second motor 3, instead. As an example of the parallel circuit, there may be employed a circuit configured such that the post-air-cooling oil passage 206 branches at the branch point P into three oil passages so that the inverter 21, the first motor 2, and the second motor 3 are connected in parallel, as with the aforementioned cooling apparatus 100 of FIG. 3.

The cooling apparatus 100 according to the third embodiment will be described. The cooling apparatus 100 of the third embodiment includes the electric oil pump 101 configured by a two-port type oil pump, which is different from the aforementioned first and second embodiments. In the description of the third embodiment, the same configurations as those in the aforementioned first and second embodiments will not be described, and the same reference numerals are used.

Figure 5:
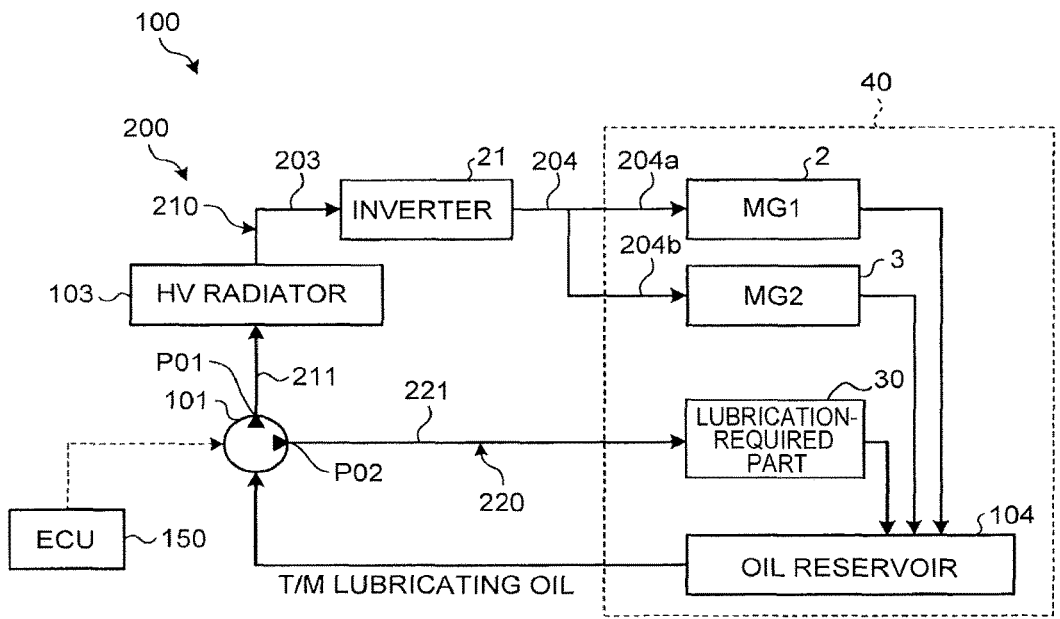
FIG. 5 is a schematic view showing a schematic configuration of a cooling apparatus according to a third embodiment.

FIG. 5 is a schematic view showing a schematic configuration of the cooling apparatus 100 according to the third embodiment. As shown in FIG. 5, in the oil circulating circuit 200 of the third embodiment, the first circuit 210 and the second circuit 220 branch from each other at the electric oil pump 101. The electric oil pump 101 includes a first discharge port $P_{O1}$ discharging the oil into the first circuit 210 and a second discharge port $P_{O2}$ discharging the oil into the second circuit 220. The first discharge port $P_{O1}$ is a port on the cooling side, and the second discharge port $P_{O2}$ is a port on the lubrication side. The oil discharged from the first discharge port $P_{O1}$ is supplied as the coolant to the inverter 21, the first motor 2 and the second motor 3. On the other hand, the oil discharged from the second discharge port $P_{O2}$ is supplied as the lubricating oil to the lubrication-required part 30.

A first discharge oil passage 211 is connected to the first discharge port $P_{O1}$. The first discharge oil passage 211 is an oil passage located between the electric oil pump 101 and the HV radiator 103 in the first circuit 210, and the oil passage is a pre-air-cooling oil passage used for supplying the oil discharged from the first discharge port $P_{O1}$ of the electric oil pump 101 to the HV radiator 103.

A second discharge oil passage 221 is connected to the second discharge port $P_{O2}$. The second discharge oil passage 221 is an oil passage located between the electric oil pump 101 and the lubrication-required part 30, and is used for supplying the lubricating oil to the lubrication-required part 30. In other words, in the third embodiment, the oil flows directly from the electric oil pump 101 to the lubrication system.

The cooling apparatus 100 of the third embodiment is not limited to the configuration including the oil circulating circuit 200 in which the inverter 21 is arranged in series with the first motor 2 and the second motor 3 (as shown in FIG. 5), and the cooling apparatus 100 may include the oil circulating circuit 200 (not shown in the drawings) in which the inverter 21, the first motor 2, and the second motor 3 are arranged in parallel. As an example of the parallel circuit, there may be employed a circuit configured such that the post-air-cooling oil passage 206 branches into three oil passages at the branch point P so that the inverter 21 is arranged in parallel with the first motor 2 and the second motor 3, as with the aforementioned cooling apparatus 100 of FIG. 3.

The vehicle in which the cooling apparatus 100 of each aforementioned embodiment is installed is not limited to a hybrid vehicle (strong hybrid vehicle) as shown in FIG. 1. For example, the vehicle may include an electric vehicle (EV) in which only motors are installed as a power source, a plug-in hybrid vehicle (PHV) chargeable from an external electric power supply, and a mild hybrid vehicle in which a motor having a relatively small output is installed. A mild hybrid vehicle is a vehicle including an engine as a main power source, and a single motor serving both as a starter motor to start up the engine and as an electric power generator (alternator). The motor installed in the mild hybrid vehicle assists a driving force at the vehicle starting time, and also functions as a regenerative brake at the braking time.

The present cooling apparatus is not limited to each aforementioned embodiment, and may appropriately be changed without departing from the scope of the present cooling apparatus.

For example, in the cooling apparatus 100, the number of motors included in the cooling-required part is not limited to a particular one, and two or more motors may be treated as a cooling target. In each aforementioned embodiment, the case in which the vehicle Ve is a two-motor type hybrid vehicle has been described, but the vehicle may be a one-motor type hybrid vehicle. In the cooling apparatus 100, three or more motors may be treated as a cooling target.

The cooling apparatus 100 may be configured to have a water-cooling type oil cooler instead of the HV radiator 103 that is an air-cooling type oil cooler. The cooling apparatus 100 may include at least an oil cooler capable of cooling the oil supplied to the inverter 21, the first motor 2, and the second motor 3 that are the cooling target. For this reason, it is not limited to whether the type of the oil cooler is the air-cooling type or the water-cooling type. For example, if the cooling apparatus 100 includes a water-cooling type oil cooler, the water-cooling type oil cooler may be a heat-exchanger carrying out heat-exchange between the oil flowing through the first circuit 210 and the engine coolant.

The cooling apparatus 100 may be configured to include a mechanical oil pump (MOP) driven by the engine 1 instead of the electric oil pump 101. In the cooling apparatus 100, the oil in the oil circulating circuit 200 is sent with pressure by using only a single mechanical oil pump. The mechanical oil pump may be configured by a two-port type oil pump.

What is claimed is:

1. A cooling apparatus for a vehicle, the vehicle including electric motors, an inverter, and a power transmission mechanism, the inverter connected to the electric motors, the power transmission mechanism to transmit power outputted from each of the electric motors to wheels, and the power transmission mechanism including a lubrication-required part, the cooling apparatus comprising:
   an oil pump to discharge oil;
   an oil cooler to cool a first portion of the oil discharged from the oil pump;
   a first circuit to supply the first portion of the oil discharged from the oil pump to the electric motors and the inverter via the oil cooler,
   wherein the first portion of the oil, after being cooled, flows from the oil cooler into an inside of the inverter to directly contact a heat-generating part of the inverter to remove heat, and the oil is an electric insulator; and
   a second circuit to supply a second portion of the oil discharged from the oil pump to the lubrication-required part that includes a gear of the power transmission mechanism, wherein the second circuit completely bypasses the oil cooler, the electric motors, and the inverter,
   wherein the first and second circuits return to a same oil reservoir.

2. The cooling apparatus according to claim 1, wherein the oil pump is an electric oil pump, and
   the electric oil pump is to control an oil flow rate of each of the first circuit and the second circuit.

3. The cooling apparatus according to claim 1, wherein the first circuit and the second circuit branch from each other at a branch point between the oil pump and the oil cooler.

4. The cooling apparatus according to claim 3 further comprising a flow rate control valve disposed at the branch point, the flow rate control valve regulates a distribution flow rate into the first circuit and the second circuit.

5. The cooling apparatus according to claim 4, wherein the oil pump is an electric oil pump,
   the cooling apparatus further comprising a controller configured to control an oil flow rate by controlling the electric oil pump and the flow rate control valve,
   wherein the controller is configured to
   control at least one of the electric oil pump and the flow rate control valve to increase a distribution flow rate into the first circuit when a cooling performance for the electric motors are increased, and
   control at least one of the electric oil pump and the flow rate control valve to increase a distribution flow rate into the second circuit when a lubrication performance for the lubrication-required part is increased.

6. The cooling apparatus according to claim 5, wherein the controller is configured to control the oil flow rate by controlling the electric oil pump and the flow rate control valve, to change at least one of a temperature of the oil, a temperature of the inverter, a temperature of the power transmission mechanism, and a torque of an input shaft of the power transmission mechanism.

7. The cooling apparatus according to claim 1, wherein the oil pump has a first discharge port that discharges the oil to the first circuit, and a second discharge port that discharges the oil to the second circuit.

8. The cooling apparatus according to claim 1, wherein the first circuit is a series circuit in which the inverter is arranged in series with the electric motors downstream of the oil pump, and
   the electric motors are disposed downstream of the inverter.

9. The cooling apparatus according to claim 1, wherein the first circuit is a parallel circuit in which the inverter is arranged in parallel with the electric motors downstream of the oil pump.

10. The cooling apparatus according to claim 1, wherein the first circuit has an oil passage having discharge holes that discharge the oil toward stators of the electric motors.

11. The cooling apparatus according to claim 1, wherein the lubrication-required part includes a part that is warmed by the second portion of the oil discharged from the oil pump.

12. The cooling apparatus according to claim 1, wherein each of the electric motors is arranged in a transaxle case, and serves as a power source of the vehicle.

13. A cooling apparatus for a vehicle, the vehicle including electric motors, an inverter, and a power transmission mechanism, the inverter connected to the electric motors, the power transmission mechanism to transmit power outputted from each of the electric motors to wheels, and the power transmission mechanism including a lubrication-required part, the cooling apparatus comprising:

an oil pump to discharge oil;

an oil cooler to cool a first portion of the oil discharged from the oil pump;

a first circuit to supply the first portion of the oil discharged from the oil pump to the electric motors and the inverter via the oil cooler;

a second circuit to supply a second portion of the oil discharged from the oil pump to the lubrication-required part that includes a gear of the power transmission mechanism, without passing through any oil cooler, wherein the first circuit and the second circuit branch from each other at a branch point between the oil pump and the oil cooler and the second circuit completely bypasses the oil cooler, the electric motor, and the inverter; and a flow rate control valve disposed at the branch point, the flow rate control valve and the oil pump regulate a distribution flow rate into the first circuit and the second circuit, wherein the flow rate control valve includes a first discharge port distributing oil into the first circuit and a second discharge port distributing oil into the second circuit.

\* \* \* \* \*